United States Patent [19]

Wanner et al.

[11] 4,090,297
[45] May 23, 1978

[54] POWER TOOL WITH DUST COLLECTING ARRANGEMENT

[75] Inventors: Karl Wanner, Echterdinge; Kurt Paule, Stuttgart; Hermann Adam, Sielmingen; Wilbert Reibetanz, Leinfelden, all of Germany

[73] Assignee: Robert Bosch GmbH, Stuttgart, Germany

[21] Appl. No.: 731,342

[22] Filed: Oct. 12, 1976

[30] Foreign Application Priority Data
Oct. 17, 1975 Germany .............................. 2546527

[51] Int. Cl.² .................. B27B 11/02; B27B 19/09
[52] U.S. Cl. .................................. 30/124; 30/374; 51/170 TL; 51/273
[58] Field of Search .............. 30/124, 133, 166 R, 30/392, 393, 373, 374, 394; 51/170 TL, 273

[56] References Cited
U.S. PATENT DOCUMENTS

| | | | |
|---|---|---|---|
| 2,902,067 | 9/1959 | Oakley | 30/392 |
| 3,938,251 | 2/1976 | Kareman | 30/124 |
| 3,975,821 | 8/1976 | Flicker | 30/124 |

*Primary Examiner*—Jimmy C. Peters
*Attorney, Agent, or Firm*—Michael J. Striker

[57] ABSTRACT

A hand-guided power tool comprises a housing and a base plate mounted below the housing. The base plate is adapted to be juxtaposed with an object which has material to be removed therefrom. A tool element such as a reciprocable cutting blade extends through a slot formed in the base plate and is operative for removing material from the object with concomitant production of undesirable particulate material in the circumambient region of the element. A channel member is also mounted below the housing but at a distance from the base plate to thereby form a suction channel which is in communication with the circumambient region of the tool element and which is operative for removing and guiding the particulate material from the tool element.

12 Claims, 7 Drawing Figures

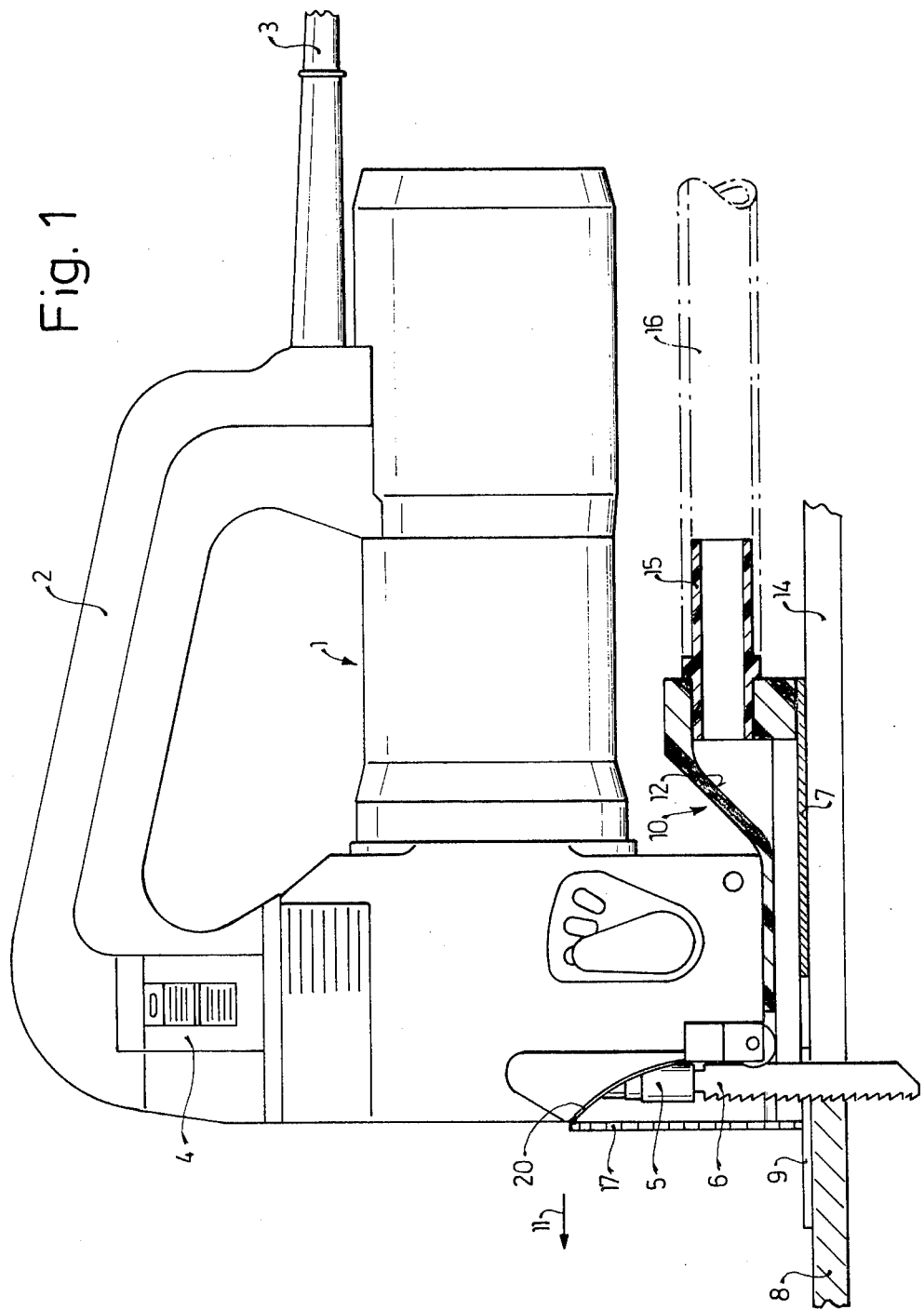

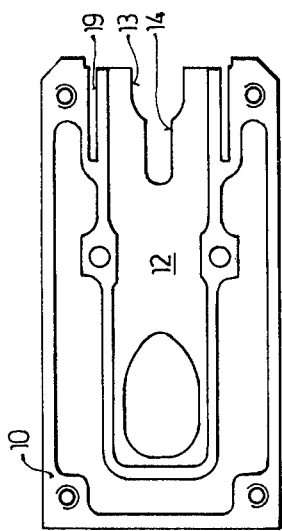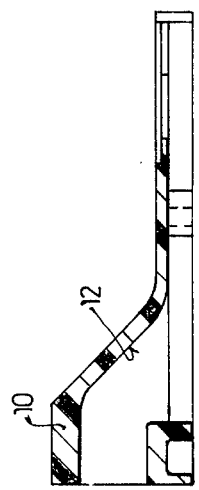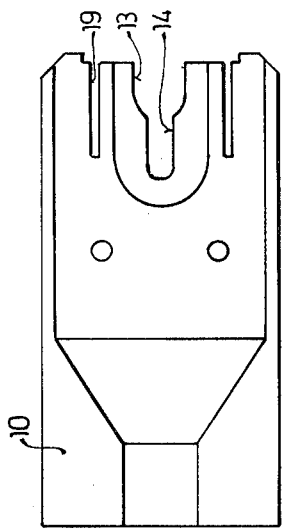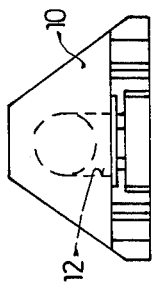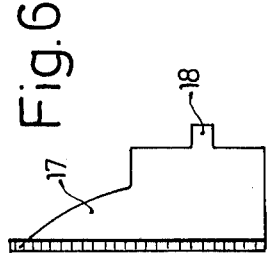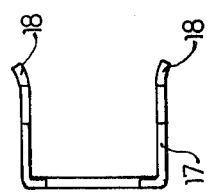

POWER TOOL WITH DUST COLLECTING ARRANGEMENT

BACKGROUND OF THE INVENTION

The present invention relates to hand-guided power tools and, more particularly, to dust collecting arrangements for such tools.

Hand-guided power tools such as saber or jigsaws, as well as reciprocable rasps are well known in the art of cutting any material such as lumber, metal, pipe, masonite, or plastics. In operation, when the material is being removed from the workpiece, undesirable particulate material or dust particles are produced. Particularly in the case where asbestos cement plates are to be cut, the resulting dust particles which are generated in the ambient atmosphere surrounding the tool constitutes a significant safety hazard for the operator. Asbestos cement plates are frequently used in many industrial applications and are comprised of chrysotile asbestos — a carcinogen. Thus, when such plates are to be cut, measures must be taken to protect the operator from breathing in such cancer-producing substances.

SUMMARY OF THE INVENTION

Accordingly, it is an object of the present invention to remove dust particles directly from the circumambient region of the tool element.

It is an additional object of the present invention to maintain the ambient atmosphere surrounding the power tool from being contaminated by dust particles.

Still another object of the present invention is to reduce the safety hazard for an operator.

In keeping with these objects and others which will become apparent hereinafter, one feature of the invention resides, briefly stated, in a combination in a hand-guided power tool which is comprised of a housing, and a base plate mounted below the housing. The base plate is adapted to be juxtaposed with an object or workpiece which has material to be removed therefrom. A tool element, such as a reciprocable cutting blade, extends through a slot formed in the base plate and is operative for removing material from the object with concomitant production of undesirable particulate material or dust particles in the circumambient region of the element. A channel member is also mounted below the housing but at a distance from the base plate so as to form a suction channel therewith. The suction channel is in communication with the circumambient region of the tool element and is operative for removing and guiding the particulate material away from the tool element.

Thus, in accordance with the invention, an elongated suction channel is provided which extends rearwardly of the housing in direction from its leading end towards its trailing end, as considered with respect to the direction of advancement of the power tool relative to the workpiece. The suction channel has one end open to the tool element and its other end in communication with a vacuum source for drawing the dust particles rearwardly of the power tool and for conducting these dust particles to a dust collection zone. Hence, the safety hazard for an operator is significantly reduced since the ambient atmosphere is no longer contaminated by any cancer-producing substances.

In accordance with yet another feature of the invention, a U-shaped hood member is mounted at the leading end of the housing so as to surround the tool element in part. The hood member has lower and upper regions which are mounted on the base plate and housing respectively. Thus, the hood member bounds the circumambient region of the element and substantially confines the dust particles thereto. The hood member is preferably constituted of transparent material, for example plastic material, so as to permit the operator to view the operation of the tool element. In the case wherein the power tool is a saber saw, a transparent hood member will facilitate the viewing of the cutting line while it is being formed in the workpiece.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings.

BRIEF DESCRIPTION OF THE DRAWINGS

FIG. 1 is a side view in partial section showing a preferred embodiment of the invention;

FIG. 2 is a side view in vertical section of a member forming the suction channel of FIG. 1;

FIG. 3 is a bottom view of a member for forming the suction channel of the embodiment of FIG. 1;

FIG. 4 is a top view of a member forming the suction channel of the embodiment of FIG. 1;

FIG. 5 is an end view of the member forming the suction channel of FIG. 2;

FIG. 6 is a side view in vertical section of a hood member of FIG. 1; and

FIG. 7 is a top view of the detail of FIG. 6.

DESCRIPTION OF THE PREFERRED EMBODIMENTS

Referring firstly to FIG. 1, it will be seen that reference numeral 1 identifies a housing of a power tool of the type which is hand-guided in direction of the arrow 11 relative to the workpiece 8. The housing 1 is formed with an integral handle 2 and has an electromotor, for example a universal motor, contained in the interior of the housing 1. A power cable 3 enters the housing at handle 2 and is connected to the non-illustrated electromotor by the power switch 4. The motor is coupled to a crank drive which is in turn connected to the armature 5 at the lower end of the housing. Thus, the motor is operative for reciprocating the armature 5 in vertical direction. A tool element such as cutting blade 6 is mounted on the movable armature 5 so that operation of the motor will result in moving the blade 6 in a to-and-fro manner. Specific details of the motor and crank drive have been omitted for the sake of clarity, since they are conventional in the art and as such form no part of the invention.

In accordance with the invention, a base plate 7 is mounted below the housing 1. The plate 7 has a slot 9 and is adapted to be juxtaposed with the workpiece 8, such as an asbestos cement plate, which has material to be removed therefrom, for example, by cutting. The tool element 6 extends through the slot 9 and, as described above, is operative for removing material from the workpiece 8.

A dust collecting arrangement is mounted below and rearwardly of the housing 1, and is operative for removing undesirable particulate material or dust particles which are produced in the circumambient region of the element 6 during the operation of the latter. The dust collecting arrangement includes a channel member 10 which is spaced a distance from the base plate 7 so as to form suction channel 12. The suction channel 12 is elongated and extends from the leading end of the housing rearwardly towards the trailing end of the housing. The channel 12 has an end in communication with the circumambient region of the element 6 and its other end adapted to be connected with a vacuum source.

The leading portion of the channel member 10 as well as the leading portion of the plate 7 are both bifurcated so as to form said slot 9 with an open end which faces outwardly of the housing. Thus the tool element 6 is surrounded at its three sides. The preferred shape of the slot 9 is shown in FIGS. 3 and 4. The slot has a first arcuate section 13 and a second narrowed section 14 rearwardly of the first section and of less width than the first section. The length of both sections 13 and 14 behind the tool element 6 amounts to approximately 20 millimeters.

In order to maintain the weight of the power tool as small as possible, it is desirable to keep the additional weight of the dust collecting arrangement at a minimum. Therefore, the channel member is preferably constituted of a light-weight material, such as plastic material or any metal material having a relatively low weight characteristic.

A tubular terminal support 15 has one end mounted to the other end of the suction channel 12 so that the support 15 extends generally parallel to the arrow 11. The other end of the support 15 is adapted to be connected in sliding frictional engagement with tube 16, as shown in dashed lines. A non-illustrated conventional vaccum source or suction device is connected with the tube 16 and is operative for drawing the dust particles from the circum ambient region of the element 6 through suction channel 12, through the interior passage of support 15, and through the interior of the tube 16, respectively. The tube is preferably of plastic material and has an inner diameter of about one-half inch. This feature will insure that adequate flow of dust particles away from the power tool without sacrificing the managability and handling of the same.

In order to confine the dust particles about the element 6 to the immediate vicinity of the latter, a hood member 17 of U-shaped configuration (see FIG. 7) is mounted at the open leading end of the housing 1 and surrounds the element 6 at three sides thereof. The hood 17 is preferably constituted of transparent material, e.g., acrylic glass and permits an operator to view the operation of the element 6. The hood 17 is fixedly mounted on the housing 1 by means of a pair of clamping hooks 18 which engage cooperating recesses in the housing. The lower side of hood 17 is mounted directly on the base plate 7, and the lateral sides of the hood 17 pass through the lateral recesses 19 formed in the channel member 10. The upper side of hood 17 is mounted on the housing 1 with slight clearance 20. Air is drawn from the exterior of the power tool past said clearance 20 into the interior of the power tool during operation of the dust collecting arrangement. This air flow serves to prevent any dust particles from settling in the clearance and thereby obstructing the view of the operator.

In accordance with the invention, at least 96 to 97% of the total amount of dust particles are removed by the dust collecting arrangement. The dust particles are initially hurled upwardly towards the hood 17 whereupon, after impingement therewith, the dust particles are downwardly drawn and sucked off through the suction channel 12. The dust particles which are initially hurled towards the workpiece in direction towards the cutting line 21 are drawn upwardly and also sucked off through the channel 12.

An optimal suction force has been found to be about 200 dm$^3$/min. so that the length of the sections 13 and 14 of the slot 9 preferably amounts to approximately 20 millimeters.

It will be understood that each of the elements described above, or two or more together, may also find a useful application in other types of constructions, differing from the types described above.

While the invention has been illustrated and described as embodied in a power tool with dust collecting arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the specific or generic aspects of this invention.

What is claimed as new and desired to be protected by Letters Patent is set forth in the appended claims:

1. In a hand-guided power tool, a combination comprising a housing having a leading end, as considered with respect to the direction of advancement of the power tool relative to the object, which is open to the ambient atmosphere and to said circumambient region of said element; a base plate mounted on said housing and having a slot, said base plate being adapted to be juxtaposed with an object from which material is to be removed; a tool element extending through said slot and operative for removing material from the object with concomitant production of undesirable particulate material in the circumambient region of said tool element; a hood member mounted at said open leading housing end for substantially closing the latter to thereby confine the particulate material substantially to said circumambient region of said element; and means for removing said particulate material directly from said region, including a channel-defining member mounted intermediate said housing and said base plate, and being spaced from said base plate so as to form with the same a suction channel which extends to said region and operative for guiding said particulate material away from said tool.

2. The combination of claim 1, wherein said base plate has a leading portion and a trailing portion as considered with respect to the direction of advancement of the power tool relative to the object, said leading portion being provided with said slot, and said suction channel being provided on said trailing portion.

3. The combination of claim 1, wherein said hood member has a generally U-shaped configuration and is constituted of transparent material.

4. The combination of claim 1, wherein said hood member has an end region mounted on said base plate.

5. The combination as defined in claim 4, wherein said hood member has another end region mounted on said housing with clearance relative thereto which is open during removing the material from the object so that air from ambient atmosphere is drawn through said clearance into said region and then from the latter by virtue of said removing means, whereby cross-flow aspiration of said particulate material is obtained during removing the material from the object.

6. In a hand-guided power tool, a combination comprising a housing; a base plate mounted on said housing and adapted to be juxtaposed with an object from which material is to be removed, said base plate having a leading portion and a trailing portion as considered with respect to the direction of advancement of the power tool relative to the object, said leading portion being provided with said slot; a tool element extending through said slot and operative for removing material from the object with concomitant production of undesirable particulate material in the circumambient region of said tool element; and means for removing said particulate material directly from said region, including a channel-defining member mounted intermediate said housing and said base plate, and being spaced from said base plate so as to form with said trailing portion of said base plate a suction channel which extends to said region and operative for guiding said particulate material away from said tool element, said channel-defining member having a leading portion and a trailing portion, as considered with respect to the direction of advancement, which respectively overlie the leading and trailing portions of said base plate, said leading portions of both said channel-defining member and said base plate being bifurcated so as to form said slot with an open end facing outwardly of said housing.

7. The combination of claim 6, wherein said channel-defining member is constituted of light-weight material.

8. The combination of claim 6, wherein said slot has a first section through which said tool element extends and a second section of relatively lesser width than said first section.

9. The combination of claim 8, wherein said slot has a length of approximately 20 millimeters.

10. The combination of claim 6; and further comprising a terminal support mounted on said housing and being elongated generally in direction of the advancement of the power tool relative to the object, said terminal support having an end region in communication with said suction channel and another end region adapted to be connected with a tubular conduit for guiding the particulate material away from the power tool.

11. The combination of claim 6, wherein said tool element is a reciprocable cutting blade.

12. The combination as defined in claim 6; and further comprising drive means located in said housing and operative for actuating said tool element so that the latter removes material in particulate form of the object.

* * * * *